(12) United States Patent
Matsuo et al.

(10) Patent No.: US 7,674,746 B2
(45) Date of Patent: *Mar. 9, 2010

(54) CATALYST FOR CLARIFYING EXHAUST GAS AND METHOD FOR PREPARATION THEREOF, AND EXHAUST GAS CLARIFICATION CATALYST DEVICE FOR VEHICLE

(75) Inventors: Yuichi Matsuo, Wako (JP); Kazunori Kiguchi, Wako (JP); Norihiko Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 529 days.

This patent is subject to a terminal disclaimer.

(21) Appl. No.: 10/568,505

(22) PCT Filed: Aug. 20, 2004

(86) PCT No.: PCT/JP2004/011990

§ 371 (c)(1),
(2), (4) Date: Feb. 16, 2006

(87) PCT Pub. No.: WO2005/025741

PCT Pub. Date: Mar. 24, 2005

(65) Prior Publication Data

US 2006/0287196 A1 Dec. 21, 2006

(30) Foreign Application Priority Data

Sep. 12, 2003 (JP) .............................. 2003-321214

(51) Int. Cl.
*B01J 23/00* (2006.01)
*B01J 23/02* (2006.01)
*B01J 23/40* (2006.01)
*B01J 23/42* (2006.01)
*B01J 23/44* (2006.01)
*B01J 21/04* (2006.01)

(52) U.S. Cl. ........................ 502/333; 502/302; 502/303; 502/304; 502/327; 502/339; 502/355; 502/415; 502/439

(58) Field of Classification Search ................. 502/326, 502/328, 333, 339, 340, 302, 303, 304, 327, 502/355, 415, 439
See application file for complete search history.

(56) References Cited

U.S. PATENT DOCUMENTS 3,388,077 A * 6/1968 Hoekstra ..................... 502/328

(Continued)

FOREIGN PATENT DOCUMENTS

EP 1 661 619 A1 5/2006

(Continued)

OTHER PUBLICATIONS

Jon Hangas; Observation Of Aluminate Whiskers And Nanotubes In Dynamometer-Aged Three-Way Automotive Catalysts; Mar. 2003; vol. 86; No. 4; pp. 267-272.

(Continued)

*Primary Examiner*—Cam N Nguyen
(74) *Attorney, Agent, or Firm*—Arent Fox LLP

(57) ABSTRACT

A purification catalyst for exhaust gas enhances the activities of the precious metals, preventing drop of activities at high temperature, and exhibiting a sufficient performance even during low temperature (below 400° C.) operation when starting a vehicle or during idling. The Pd oxide is supported on the Al oxide, and the Al oxide is $LnAlO_3$ (Ln: rare-earth element).

3 Claims, 2 Drawing Sheets

U.S. PATENT DOCUMENTS

| | | | | |
|---|---|---|---|---|
| 4,134,852 A * | 1/1979 | Volin | | 502/302 |
| 4,151,123 A | 4/1979 | McCann, III | | |
| 4,492,769 A * | 1/1985 | Blanchard et al. | | 502/262 |
| 4,921,829 A * | 5/1990 | Ozawa et al. | | 502/302 |
| 5,234,881 A * | 8/1993 | Narula et al. | | 502/262 |
| 5,380,692 A * | 1/1995 | Nakatsuji et al. | | 502/303 |
| 5,691,263 A * | 11/1997 | Park et al. | | 502/66 |
| 5,801,114 A * | 9/1998 | Durand et al. | | 502/302 |
| 5,977,017 A * | 11/1999 | Golden | | 502/302 |
| 6,043,188 A * | 3/2000 | Yeo | | 502/333 |
| 6,060,420 A * | 5/2000 | Munakata et al. | | 502/302 |
| 6,500,392 B2 * | 12/2002 | Mizuno et al. | | 422/177 |
| 6,569,803 B2 * | 5/2003 | Takeuchi | | 502/328 |
| 7,259,127 B2 * | 8/2007 | Suzuki et al. | | 502/339 |
| 2006/0199731 A1 * | 9/2006 | Noda et al. | | 502/328 |
| 2006/0287196 A1 | 12/2006 | Matsuo et al. | | |

FOREIGN PATENT DOCUMENTS

| | | |
|---|---|---|
| JP | 61-209045 A | 9/1986 |
| JP | 62-282642 A | 12/1987 |
| JP | 64-43347 A | 2/1989 |
| JP | 03-052642 A | 3/1991 |
| JP | 3-68451 A | 3/1991 |
| JP | 03-068451 A | 3/1991 |
| JP | 4-27433 A | 1/1992 |
| JP | 4-341343 A | 11/1992 |
| JP | 5-86259 A | 4/1993 |
| JP | 5-285387 A | 11/1993 |
| JP | 7-88372 A | 4/1995 |
| JP | 10-277393 A | 10/1998 |
| JP | 2003-175337 A | 6/2003 |
| JP | 2003-321214 A | 11/2003 |
| RU | 2006 106 714 A | 5/2004 |

OTHER PUBLICATIONS

Hua-Min Zhang et al.:, "Preparation of peroskite-type oxides with large surface area by citrate process", Chemistry Letters, Chemical Society of Japan. Tokyo, 1987, pp. 665-668, XP002508315.

* cited by examiner $a = b \neq c$ $a = b = c$

US 7,674,746 B2

CATALYST FOR CLARIFYING EXHAUST GAS AND METHOD FOR PREPARATION THEREOF, AND EXHAUST GAS CLARIFICATION CATALYST DEVICE FOR VEHICLE

CROSS REFERENCE TO RELATED APPLICATION

This application is a National Stage entry of International Application No. PCT/JP2004/011990, filed Aug. 20, 2004, the entire specification claims and drawings of which are incorporated herewith by reference.

TECHNICAL FIELD

The present invention relates to a purification catalyst for exhaust gas, to a production method therefor, and to a purification catalyst device for exhaust gas, and specifically relates to a production technique for a purification catalyst for exhaust gas in which nitrogen oxide (NOx), carbon hydride (HC), and carbon monoxide (CO) contained in an exhaust gas emitted from an internal combustion engine of an automobile or the like during low-temperature operation can be simultaneously and effectively reduced so that the exhaust gas is purified.

BACKGROUND ART

For purifying exhaust gas containing, for example, CO, HC, NO, and $NO_2$, precious metals (Pt, Rh, Pd and Ir) exhibit high performance. Therefore, it is preferable to employ the above-mentioned precious metals in the purification catalyst for exhaust gas. These precious metals are generally mixed with or supported by $Al_2O_3$ of high surface-to-weight ratio together with additives such as La, Ce, and Nd. On the other hand, composite oxides (for example, a perovskite-like oxide), made by combining various elements, have extremely varied properties. Therefore, it is preferable for a purification catalyst for exhaust gas to employ the above-mentioned composite oxides. Moreover, when the precious metal is supported by the composite oxides, the properties of precious metal are significantly changed. From this viewpoint, a preferable performance for purifying exhaust gas can be obtained in the purification catalyst for exhaust gas in which a precious metal is supported by a composite oxide.

Various catalysts mentioned above are now being developed, and for example, a technique in which a coalescence rate of the precious metal can be reduced by having a perovskite be a support, judging from deterioration of the precious metal with reduction of active sites by coagulation of the precious metal, is proposed (see claims of Japanese Unexamined Application Publication No. 5-86259). Moreover, another technique in which reduction of PdO can be reduced by using a perovskite in which the A site is defective, judging from reducing PdO which is an activated species in a NO reduction reaction, whereby the PdO changes to Pd which is low-active Pd, when the precious metal is Pd, is proposed (see the claims of reactions disclosed in Japanese Unexamined Application Publication No. 2003-175337). Usually, precious metals are used on a support of $Al_2O_3$ or the like, either alone or in combination, but in severe conditions such as in an automobile, active sites decrease due to coagulation, and the activity drops substantially. To solve this problem, it is proposed to use precious metals together with other elements in a form of composite oxides. As for Pd, in particular, composite oxides of rare-earth metals and Pd have been disclosed (see the claims of Japanese Unexamined Application Publication No. S61-209045, the claims of Japanese Unexamined Application Publication No. H1-43347, the claims of Japanese Unexamined Application Publication No. H4-27433, the claims of Japanese Unexamined Application Publication No. H4-341343, the claims of Japanese Unexamined Application Publication No. H7-88372, and the claims of Japanese Unexamined Application Publication No. H10-277393).

Conventional purification catalysts for exhaust gas exhibit sufficient performance for reducing CO, HC, and NOx (NO, $NO_2$, etc.) contained in exhaust gas, in a running of vehicle, particularly during running at high temperatures (not less than 400° C.). However, the conventional catalysts cannot exhibit sufficient performance for reducing CO, HC, and NOx, in a vehicle at the starting or idling thereof at low temperatures (below 400° C.).

As mentioned above, the reason that sufficient performance for purifying the exhaust gas cannot be obtained in the running at low temperature is as follows. That is, in the conventional purification catalyst for exhaust gas, a precious metal, for example, Pt, Rh, or Pd, is supported on $Al_2O_3$ having a high surface-to-weight ratio. Due to the high surface-to-weight ratio of the $Al_2O_3$, the precious metal is advantageously supported in a highly dispersed condition. However, $Al_2O_3$ is a stable compound, and does not mutually affect a supported precious metal, whereby activity of the precious metal is not improved. Accordingly, sufficient performance during the running at low temperature may not be obtained.

Moreover, in the running of a vehicle, it is preferable for Pd to exist in a condition of PdO which is highly reactive. However, even if Pd supported on the $Al_2O_3$ initially exists in a condition of PdO, the Pd is reduced to be in a metal condition at high temperatures (not less than 900° C.), and as Pd coagulates, active sites decrease, whereby the activity is significantly reduced.

DISCLOSURE OF THE INVENTION

The invention was made in light of the above demands, and it is hence an object thereof to provide a purification catalyst for exhaust gas, in which activity of the precious metal is improved, and the reduction of activity at high temperatures is prevented, whereby sufficient performance even during a vehicle starting up or idling at low temperatures (below 400° C.) can be obtained, and a production method therefor, and a purification catalyst device for exhaust gas.

The present inventors have intensively researched purification catalysts for exhaust gas, in which sufficient performance, even in a vehicle starting up or idling at low temperatures (below 400° C.), can be exhibited. As a result, maintenance of high activity in low temperature operation after exposure to high temperature has been discovered in the purification catalyst for exhausts gas obtained by supporting Pd oxide on a support of perovskite composite oxide expressed as $LnAlO_3$ (Ln is any rare-earth element, including La, Ce, Pr, Nd, Pm, Sm, etc.) obtained by baking a precursor salt of carboxylic complex polymer.

The present invention (the first aspect of the invention) was made in light of the above knowledge. That is, a purification catalyst for exhaust gas of the present invention is a catalyst in which Pd is supported on an Al oxide, and the oxide is $LnAlO_3$ (Ln: rare-earth element).

Moreover, the present inventors have also learned that a $LaAlO_3$ among $LnAlO_3$ compounds, is trigonal or rhombohedral, and a B site in the perovskite is Al in the $LaAlO_3$, whereby the dipole moment of the $LaAlO_3$ is large, and an electric fluctuation of PdO bounded on the $LaAlO_3$ is larger than that of PdO which exists independently. Therefore, the oxidation state of Pd in a surface of the PdO supported is a state of $Pd^{2+}$ over a large area. This state is a preferable state for purifying exhaust gas, whereby high activity at low temperatures can be obtained. Additionally, the present inventors have confirmed that this catalyst can exhibit high activity at low temperatures even after exposing the catalyst to operating conditions of about 1000° C.

That is, in the above-mentioned purification catalyst for exhaust gas (the first invention), it is preferable that the aluminum oxide be trigonal or rhombohedral (the second aspect of the invention).

The inventors have attempted to combine the Pd oxide with a composite oxide containing Pd and at least one rare-earth element (for example, $Ln_2PdO_4$), and support this composite oxide on the $LnAlO_3$ (Ln: rare-earth element), and discovered that a higher activity at low temperature is obtained. More specifically, the Pd composite oxide is a compound of Pd oxide which is unstable at high temperature, and a stable rare-earth element oxide. Therefore, in the Pd composite oxide, the oxidation state of Pd is stabilized, and the oxidation state of Pd is $Pd^{2+}$ in a large area, which is preferred for purification of exhaust gas. As a result, a high purification activity of exhaust gas is obtained. In addition, since the Pd composite oxide can maintain the state of oxide up to about 1100° C., a high heat resistance is realized. Moreover, the Pd composite oxide is a compound of rare-earth elements not high in the degree of crystallinity and Pd, and the produced Pd composite oxide is particles of low degree of crystallinity, and hence the dispersion of Pd is high. Hence, active sites increase, and a high purification activity of exhaust gas is obtained. In addition, the catalyst of the invention having the composite oxide supported on $LnAlO_3$ contains rare-earth elements in both composite oxides, and the contact surfaces of two composite oxides partly form solid solutions by way of the rare-earth element, and the mobility of Pd composite oxide is lowered, and mutual coagulation of Pd composite oxide particles is suppressed, and a high durability is obtained.

The present invention (the third aspect of the inventions) was made in light of the above knowledge. That is, preferably, the third aspects of the invention relates to the purification catalyst for exhaust gas in the first or second aspect of the invention, in which the Pd oxide contains at least $Ln_2PdO_4$ (Ln: rare-earth element). As the Pd composite oxide, aside from $Ln_2PdO_4$, also, $Ln_2Pd_2O_5$, $Ln_4PdO_7$, etc., may be contained.

In the manufacturing process of $LnAlO_3$, the inventors have attempted to produce a carboxylic complex polymer by evaporating and solidifying an aqueous solution of nitrate of constituent elements containing carboxylic acid, and discovered that $LnAlO_3$ is produced in a single phase, and further that the surface of $LnAlO_3$ easily interacts with Pd oxide when Pd oxide is supported. As a result, a high activity at low temperature is obtained in the purification catalyst for exhaust gas having Pd oxide supported on $LnAlO_3$.

The present invention (the fourth and fifth aspects of the inventions) was made in light of the above knowledge. That is, in the above-mentioned purification catalysts for exhaust gas (the first and third aspects of the invention), it is preferable that at least one kind of compound selected from a group of compounds (carboxylic acid having a hydroxyl group or a mercapto group and having a carbon number of 2 to 20, dicarboxylic acid having a carbon number of 2 or 3, and monocarboxylic acid having a carbon number of 1 to 20) be added to an aqueous nitrate solution including a component, whereby a purification catalyst for exhaust gas is obtained (the fourth aspect of the invention). Moreover, in the purification catalysts for exhaust gas (the fourth aspect of the invention), it is preferable that the aqueous nitrate solution be evaporated completely to obtain a carboxylic acid complex polymer, and that the carboxylic acid complex polymer be heated, whereby a purification catalyst for exhaust gas is obtained (the fifth aspect of the invention).

As the carboxylic acid having a hydroxyl group or a mercapto group and having a carbon number of 2 to 20, oxycarboxylic acid and a compound in which an oxygen atom in the hydroxyl of the oxycarboxylic acid is replaced with a sulfur atom are cited. The carbon number of these carboxylic acids is 2 to 20 in light of solubility in water, is preferably 2 to 12, is more preferably 2 to 8, and is most preferably 2 to 6. Moreover, the carbon number of the monocarboxylic acid is 1 to 20 in light of solubility in water, is preferably 1 to 12, is more preferably 1 to 8, and is most preferably 1 to 6.

Furthermore, as concrete examples of the carboxylic acids having a hydroxyl group or a mercapto group and having a carbon number of 2 to 20, for example, glycolic acid, mercaptosuccinic acid, thioglycolic acid, lactic acid, β-hydroxy propionic acid, malic acid, tartaric acid, citric acid, isocitric acid, allo-citric acid, gluconic acid, glyoxylic acid, glyceric acid, mandelic acid, tropic acid, benzilic acid, and salicylic acid are cited. As concrete examples of the monocarboxylic acids, for example, formic acid, acetic acid, propionic acid, butyric acid, isobutyric acid, valeric acid, isovaleric acid, hexanoic acid, heptanoic acid, 2-methyl hexanoic acid, octanoic acid, 2-ethyl hexanoic acid, nonanoic acid, decanoic acid, and lauric acid are cited. In the above-mentioned acids, it is preferable to use acetic acid, oxalic acid, malonic acid, glycolic acid, lactic acid, malic acid, tartaric acid, glyoxylic acid, citric acid, gluconic acid, and it is more preferable to use oxalic acid, malonic acid, glycolic acid, lactic acid, malic acid, tartaric acid, glyoxylic acid, citric acid, or gluconic acid.

Next, a production method for a purification catalyst for exhaust gas of the present invention (the sixth aspect of the invention) is a method for preferably producing the above-mentioned catalysts (the first to fifth aspects of the invention). That is, the sixth aspect of the invention is a method in which when the purification catalyst for exhaust gas in which Pd oxide is supported on an aluminum oxide, at least one kind of compound selected from a group of compounds (carboxylic acid having a hydroxyl group or a mercapto group and having a carbon number of 2 to 20, a dicarboxylic acid having a carbon number of 2 or 3, and a monocarboxylic acid having a carbon number of 1 to 20) is added to an aqueous nitrate solution including a component, whereby a purification catalyst for exhaust gas is obtained.

In the above-mentioned production method for a purification catalyst for exhaust gas (the sixth aspect of the invention), it is preferable that the aqueous nitrate solution be evaporated completely to obtain a carboxylic acid complex polymer, and that the carboxylic acid complex polymer be heated (the seventh aspect of the invention), and it is more preferable that the heating temperature be not more than 1000° C. (the eighth aspect of the invention).

The above purification catalyst for exhaust gas and its manufacturing method are the summary of the invention, but the inventors have further researched specific applications of the first to eighth aspects of the invention, and found that the purification catalyst for exhaust gas of the invention is particularly suited to an internal combustion engine for an automobile, and have thereby completed a ninth aspect of the invention.

The ninth aspect of the invention is a purification catalyst for exhaust gas for purifying exhaust gas from an automobile having Pd oxide supported on Al oxide, in which the Al oxide is $LnAlO_3$ (Ln: rare-earth element).

The purification catalyst for exhaust gas of the present invention in which PdO is supported on $LnAlO_3$ has a function in which the reduction of PdO to Pd metal can be decreased. The shape of Ln (rare-earth metal) variously changes in oxide states. For example, when a catalyst made by supporting Pd on $La_2O_3$ is exposed to high temperature conditions, $La_2O_3$ migrates onto the Pd grain from the contact area between Pd and $La_2O_3$, whereby a shape of filling up $La_2O_3$ with Pd is formed, resulting in additional migration of minute amounts of $La_2O_3$ onto the Pd surface (Zhang et al., J. Phys. Chem., Vol. 100, No. 2, pp. 744-755, 1996). Even in the present system ($LnAlO_3$), Ln and Pd form a complex compound, whereby reduction of PdO to Pd metal can be decreased. Owing to this effect, a purification catalyst for exhaust gas of the present invention can maintain a high activity state while running at low temperatures (below 400° C.).

Moreover, in the $LnAlO_3$, for example $LaAlO_3$ is characterized in that the crystal system is trigonal or rhombohedral and the B site of perovskite is Al. The trigonal or rhombohedral is, as shown in FIG. 1, a crystal system in which an ideal cubic system of a unit lattice is changed in the c-axis direction, and the angle between the a-axis and the b-axis is 120°. That is, the trigonal is a crystal system in which an ideal cubic system of a perovskite structure is significantly strained. In the crystal system, the electron state among constituent atoms is extremely unstable. In the rhombohedral system, as shown in FIG. 2, the trigonal system is expressed by a different basic axis, and the structure itself is the same as in the trigonal system. FIG. 3 is an XRD spectrum as data demonstrating the difference in crystal systems of $LaAl_3$ supporting Pd or Pd oxide. That is, comparing the structures of $LaAlO_3$ and $NdAlO_3$, and $GdAlO_3$ which is another perovskite supporting Pd or Pd oxide in conventional purification catalyst for exhaust gas, as can be seen from the diagram, crystal systems of $LaAlO_3$ and $NdAlO_3$ are trigonal or rhombohedral, while the crystal system of $GdAlO_3$ is neither trigonal nor rhombohedral, but is orthorhombic.

On the other hand, in the $LaAlO_3$, $NdAlO_3$, a B site in the perovskite is Al, whereby the bond between Al and O has a high degree of probability of being a covalent bond. Therefore, some of the dipole moment is generated in a crystal of perovskite which has generally a high degree of probability of being an ionic bond. As described above, the perovskite, that is $LaAlO_3$, $NdAlO_3$, are trigonal or rhombohedral, and a B site in the perovskite-like composite oxides is Al in the oxides, whereby dipole moment of the oxides is larger than that of the well-known purification catalyst for exhaust gas, for example $LaFeO_3$.

Due to the dipole moment, an electric fluctuation of PdO bound on the $LaAlO_3$ or $NdAlO_3$ is larger than that in which PdO exists independently. Therefore, the oxidation state of Pd in a surface of the PdO supported is a state of $Pd^{2+}$ over a large area. There are two oxidation states of Pd in a surface of the PdO, which are a state of $Pd^{2+}$ and a state of $Pd^0$ (metal state). That is, in the purification catalysts for exhaust gas of the present invention in which PdO is supported on the $LaAlO_3$ or $NdAlO_3$, the oxidation state of Pd in a surface of the PdO is the state of $Pd^{2+}$, whereby the catalysts of the present invention have high activity. Moreover, the catalysts of the present invention can exhibit high activity during the running at low temperatures (below 400° C.) even after exposing the catalyst to an operating condition of about 1000° C.

Furthermore, when the $LaAlO_3$ or $NdAlO_3$ is produced, an aqueous nitrate solution of a component containing carboxylic acid is evaporated completely to obtain a carboxylic acid complex polymer, and the polymer is heated at a relatively low temperature of 800° C., whereby $LaAlO_3$ or $NdAlO_3$ are generated as a single phase.

On the other hand, when the $LaAlO_3$ or $NdAlO_3$ is produced in other ways, for example, solid-phase reaction, $LaAlO_3$ or $NdAlO_3$ is not generated as a single phase even if the heating at a relatively high temperature of 1700° C. is performed (see Rare Earth Science, Kagaku-Dojin Publishing Company, Inc, Ginya Adachi, p. 564). That is, $LaAlO_3$ or the like of the single phase can be synthesized at the above-mentioned low temperature by using carboxylic acid. Therefore, sufficient surface-to-weight ratio can be obtained, and the catalyst can be used in a state in which the surface of the crystal lattice is active. In the purification catalyst for exhaust gas made by supporting Pd on the $LnAlO_3$ by using the method of the present invention, sufficient surface-to-weight ratio and strong interaction between $LnAlO_3$ and Pd can be obtained, whereby high activity at low temperatures can be realized.

In the case of Pd composite oxide (for example, $Ln_2PdO_4$) containing Pd and at least one rare-earth element used as the Pd oxide as a constituent element of purification catalyst for exhaust gas of the invention, the effects realized by this composite oxide are explained below.

The Pd composite oxide is a composite compound of an unstable Pd oxide and a very stable oxide of a rare-earth element. For example, in the case of PdO, the PdO surface may have two chemical states, $Pd^0$ and $Pd^{2+}$. In the Pd composite oxide, however, as a result of stabilization of oxidation state by rare-earth element, the chemical state of the compound outer surface is mostly $Pd^{2+}$. Between $Pd^0$ and $Pd^{2+}$, since $Pd^{2+}$ is higher in activity, a high purification activity of exhaust gas is obtained in the Pd composite oxide.

Meanwhile, the decomposition temperature of PdO is about 800° C., but the Pd composite oxide is stably present in an oxide state at 1100° C. Therefore, the Pd composite oxide has a high heat resistance. That is, Pd of which the oxide is not stable at high temperature is compounded with rare-earth element or alkaline earth element which is stable in an oxide state, and the Pd—O bond in the bulk is fortified. The Pd composite oxide is a composite compound of rare-earth element or alkaline earth element not high in degree of crystallinity and Pd. Hence, the produced Pd composite oxide is low in degree of crystallinity, and high in dispersion of Pd. As a result, active sites are increased, and a high purification performance for exhaust gas is obtained. Further, when a composite oxide of rare-earth element and Pd is supported on a composite oxide composed of $LnAlO_3$, since rare-earth elements are contained in both composite oxides, the contact surfaces of two composite oxides partly form solid solution by way of the rare-earth elements, and the mobility of Pd composite oxide is lowered, and mutual coagulation of Pd composite oxide particles is suppressed, and a high durability is obtained.

BEST MODE FOR CARRYING OUT THE INVENTION

Figure 1:
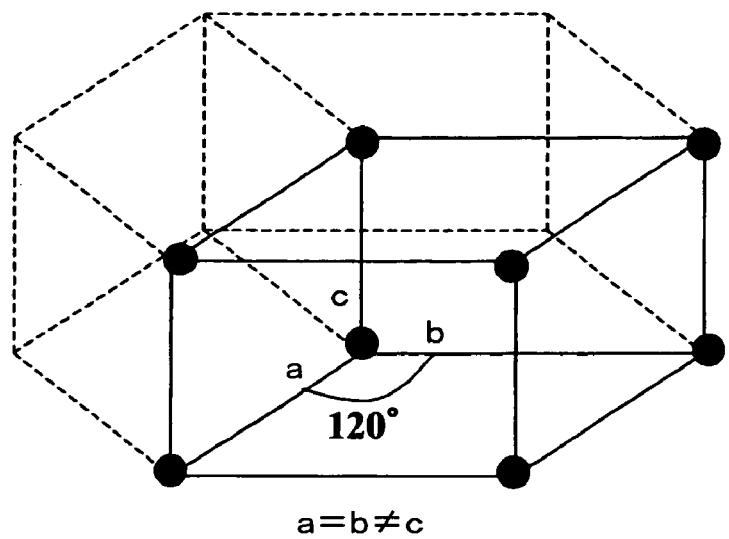
FIG. 1 is a perspective view showing an example of crystal system (trigonal) of Al oxide composing a purification catalyst for exhaust gas of the invention.
Figure 2:
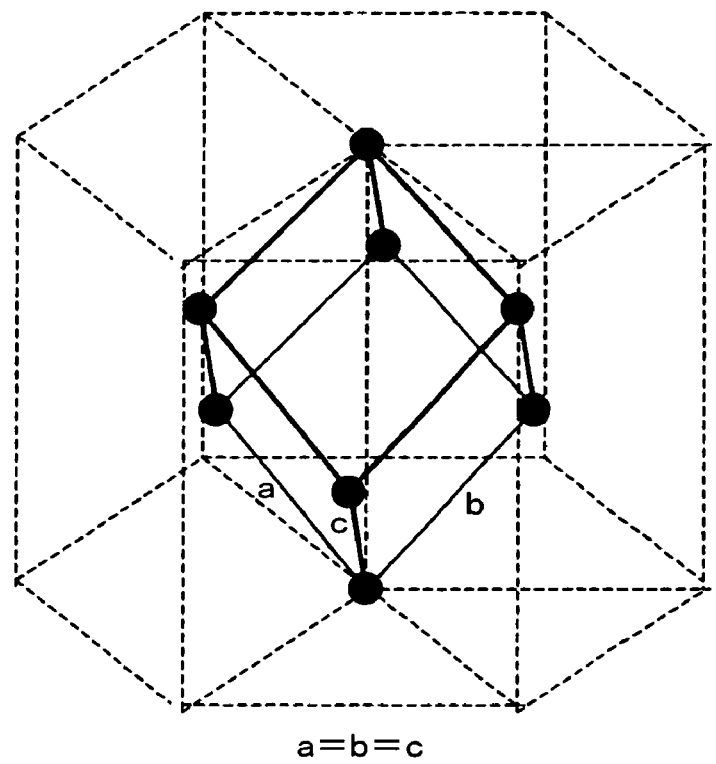
FIG. 2 is a perspective view showing an example of crystal system (rhombohedral) of Al oxide composing a purification catalyst for exhaust gas of the invention.
Figure 3:
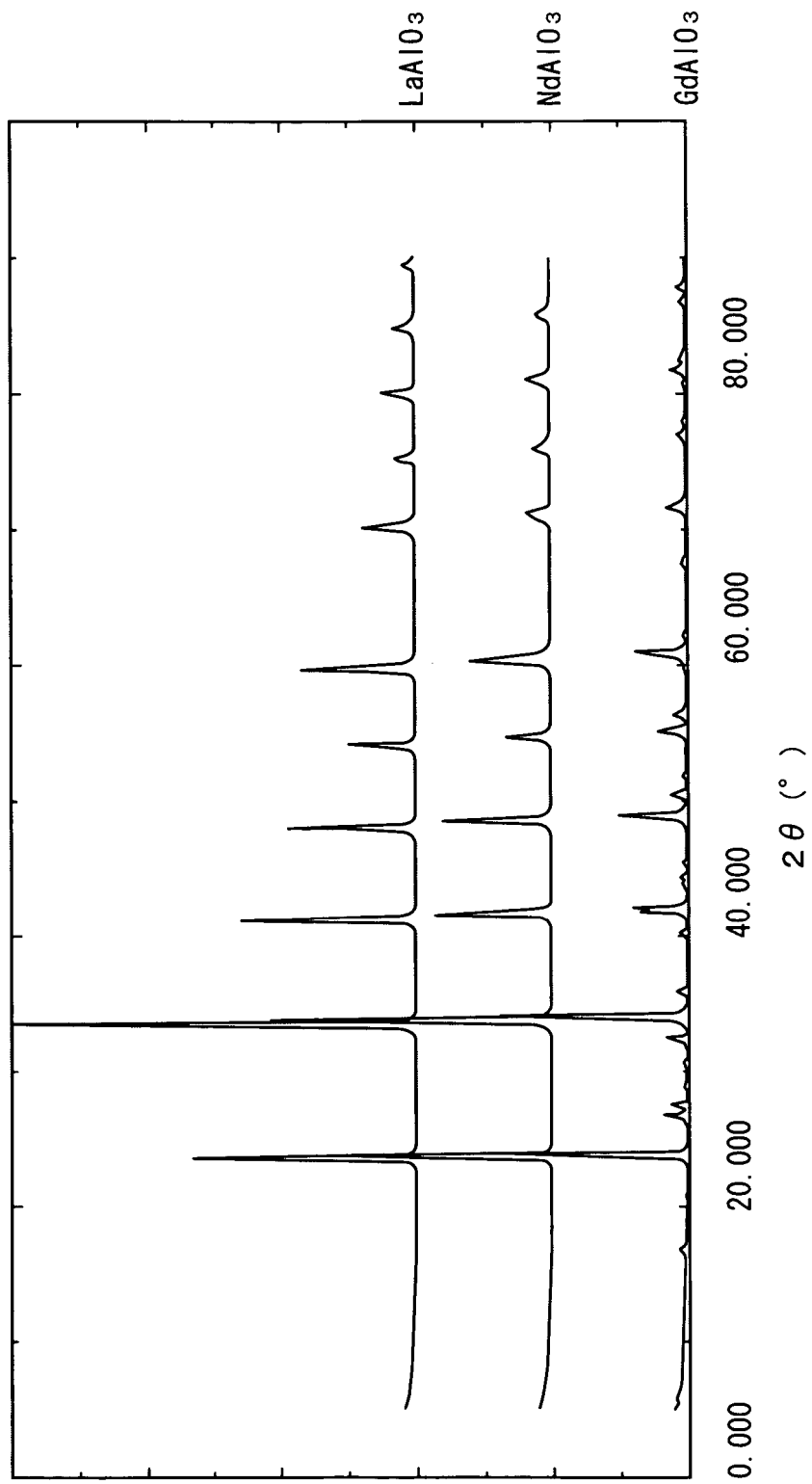
FIG. 3 is an XRD spectrum showing difference in crystal system of various Al oxides on which Pd oxides are supported.

Hereinafter, the present invention will be concretely explained by examples.

MANUFACTURING EXAMPLE 1

Production of Composite Oxides as Support

Predetermined amounts of lanthanum nitrate hexahydrate and aluminum nitrate nonahydrate were dissolved in ion-exchanged water, whereby a mixed solution was obtained. Next, a predetermined amount of malic acid was dissolved in ion-exchanged water, whereby an aqueous malic acid solution was obtained. These two solutions were mixed, the obtained mixed solution was set on a hot plate with a stirrer, and the mixed solution was heated to 250° C. and agitated by a stirring bar, whereby evaporation of water into vapor was performed, complete evaporation was performed, and the dried sample was crushed into a powder by mortar and pestle. The crushed sample was moved to an aluminum crucible, the sample was heated to 350° C. at a rate of 2.5° C./min in a muffle kiln, and a heat treatment was performed at 350° C. for 3 hours. Owing to the heat treatment, a provisional heated substance in which malate and nitrate-nitrogen (nitrate salt and nitrate ion) were removed was obtained. After crushing the provisional heated substance into powder and mixing for 15 minutes by a mortar and pestle, the obtained mixture was set in the aluminum crucible again, the sample was heated to 800° C. at a rate of 5° C./min in the muffle kiln, and a heat treatment was performed at 800° C. for 10 hours. Owing to the heat treatment, a perovskite-like composite oxide of which the composition was $LaAlO_3$ was obtained.

Support of Pd Composite Oxide

A metal salt mixed aqueous solution was prepared by dissolving predetermined amounts of palladium nitrate dehydrate and lanthanum nitrate hexahydrate in ion-exchanged water. An aqueous solution of malic acid was prepared by dissolving a predetermined amount of malic acid in ion-exchanged water. These two aqueous solutions were mixed, and this mixture and a predetermined amount of $LaAlO_3$ powder were put in an eggplant-shaped flask, and while evacuating the flask by a rotary evaporator, the mixture was evaporated and solidified in a hot bath at 60° C. By heating up to 250° C. at a rate of 2.5° C./min in a muffle kiln, the temperature was further raised to 720° C. at a rate of 5° C./min, and 750° C. was held for 3 hours. As a result, a catalyst powder of Manufacturing Example 1 of $La_2PdO_4$/$LaAlO_3$ having $La_2PdO_4$ impregnated and supported on LaAlO3 was obtained. The specific surface area and Pd dispersion degree of catalyst powder in Manufacturing Example 1 are shown in Table 1.

TABLE 1

| | | Specific surface area by BET ($m^2$/g) | | Pd dispersion degree (%) | |
|---|---|---|---|---|---|
| | | Initial | After endurance | Initial | After endurance |
| Manufacturing Example 1 | $La_2PdO_4$/$LaAlO_3$ | 9 | 5 | 17.0 | 2.4 |
| Manufacturing Example 2 | $Nd_2PdO_4$/$LaAlO_3$ | 9 | 5 | 18.3 | 2.2 |

TABLE 1-continued

| | | Specific surface area by BET ($m^2$/g) | | Pd dispersion degree (%) | |
|---|---|---|---|---|---|
| | | Initial | After endurance | Initial | After endurance |
| Manufacturing Example 3 | $Gd_2PdO_4$/$LaAlO_3$ | 8 | 5 | 19.2 | 2.1 |
| Manufacturing Example 4 | $La_2PdO_4$/$NdAlO_3$ | 9 | 5 | 17.1 | 2.8 |
| Manufacturing Example 5 | Pd/$Al_2O_3$ | 80 | 40 | 6.3 | 0.51 |
| Manufacturing Example 6 | $Tb_2PdO_4$/$LaAlO_3$ | 1 | 1 | 10.1 | 0.72 |
| Manufacturing Example 7 | $La_2PdO_4$/$GdAlO_3$ | 12 | 4 | 17.0 | 2.2 |

Estimation of Activity

Next, initial activities and activities after endurance running were estimated for the obtained catalyst powders. The estimation was performed by flowing model exhaust gas of a vehicle into catalysts under conditions in which A/F (air-fuel ratio) was substantially 14.6 and SV (stroke volume) was 5000 $h^{-1}$. Endurance running was performed for 20 hours at an endurance running temperature of 900° C. by using model exhaust gas in which A/F (air-fuel ratio) was substantially 14.6. These results are shown in Tables 2 and 3. That is, the Table 2 shows a temperature at which CO, HC, and NO are reduced by 50% in a temperature increase test of catalysts before the endurance running. Moreover, the Table 3 shows a temperature at which CO, HC, and NO are reduced by 50% in a temperature increase test of catalysts after the endurance running.

TABLE 2

| | | Temperature at which CO, HC or NO are reduced by 50% | | |
|---|---|---|---|---|
| | | CO | HC | NO |
| Manufacturing Example 1 | $La_2PdO_4$/$LaAlO_3$ | 227 | 249 | 199 |
| Manufacturing Example 2 | $ND_2PdO_4$/$LaAlO_3$ | 221 | 243 | 198 |
| Manufacturing Example 3 | $Gd_2PdO_4$/$LaAlO_3$ | 236 | 258 | 204 |
| Manufacturing Example 4 | $La_2PdO_4$/$NdAlO_3$ | 221 | 241 | 197 |
| Manufacturing Example 5 | Pd/$AL_2O_3$ | 276 | 287 | 252 |
| Manufacturing Example 6 | $Tb_2PdO_4$/$LaAlO_3$ | 249 | 268 | 239 |
| Manufacturing Example 7 | $La_2PdO_4$/$GdAlO_3$ | 236 | 257 | 209 |

TABLE 3

| | | Temperature at which CO, HC, or NO are reduced by 50% | | |
|---|---|---|---|---|
| | | CO | HC | NO |
| Manufacturing Example 1 | $La_2PdO_4$/$LaAlO_3$ | 306 | 312 | 240 |
| Manufacturing Example 2 | $Nd_2PdO_4$/$LaAlO_3$ | 298 | 302 | 241 |
| Manufacturing Example 3 | $Gd_2PdO_4$/$LaAlO_3$ | 300 | 303 | 245 |

TABLE 3-continued

| | | Temperature at which CO, HC, or NO are reduced by 50% | | |
|---|---|---|---|---|
| | | CO | HC | NO |
| Manufacturing Example 4 | La$_2$PdO$_4$/NdAlO$_3$ | 307 | 320 | 259 |
| Manufacturing Example 5 | Pd/Al$_2$O$_3$ | 326 | 335 | >400 |
| Manufacturing Example 6 | Tb$_2$PdO$_4$/LaAlO$_3$ | 328 | 331 | 280 |
| Manufacturing Example 7 | La$_2$PdO$_4$/GdAlO$_3$ | 336 | 344 | >400 |

MANUFACTURING EXAMPLE 2

In the same manner as in Manufacturing Example 1, Nd$_2$PdO$_4$/LaAlO$_3$ was manufactured, and various estimations for activity were performed. The results are shown in Tables 1 to 3.

MANUFACTURING EXAMPLE 3

In the same manner as in Manufacturing Example 1, Gd$_2$PdO$_4$/LaAlO$_3$ was manufactured, and various estimations for activity were performed. The result is shown in Tables 1 to 3.

MANUFACTURING EXAMPLE 4

In the same manner as in Manufacturing Example 1, La$_2$PdO$_4$/NdAlO$_3$ was manufactured, and various estimations for activity were performed. The result is shown in Tables 1 to 3.

MANUFACTURING EXAMPLE 5

In the same manner as in Manufacturing Example 1, Pd/Al$_2$O$_3$ was manufactured, and various estimations for activity were performed. The result is shown in Table 1 to Table 3.

MANUFACTURING EXAMPLE 6

Predetermined amounts of lanthanum oxide and aluminum oxide were mixed by mortar and pestle, the mixed sample was moved to an aluminum crucible, the sample was heated for 10 hours at 1100° C. in a muffle kiln, and LaAlO$_3$ was obtained by solid-phase reaction. Using this, Tb$_2$PdO$_4$ was supported in the same manner as in Manufacturing Example 1, Tb$_2$PdO$_4$/LaAlO$_3$ was manufactured. Various estimations for activity were performed for this catalyst. The results are also shown in Tables 1 to 3.

MANUFACTURING EXAMPLE 7

In the same manner as in Manufacturing Example 1, La$_2$PdO$_4$/GdAlO$_3$ was manufactured, and various estimations for activity were performed. The result is shown in Tables 1 to 3.

According to the Tables 2 and 3, the purification catalysts for exhaust gas of the Manufacturing Example 1 to 3 exhibit excellent temperatures at which CO, HC, and NO are reduced by 50% at any time before and after the endurance running. The reason for this is that the purification catalysts for exhaust gas of the Manufacturing Examples 1 to 3 are made by supporting Pd on the LaAlO$_3$ (Ln: rare-earth material) and these catalysts have a property of suppressing a reduction of PdO to Pd at high temperatures, whereby the high activity can be maintained in the running at low temperatures after a running at high catalyst temperatures. Also in the purification catalysts for exhaust gas in Manufacturing Examples 1 to 4, the crystal system of Al oxides is trigonal or rhombohedral, and the B site of perovskite is Al, and hence the electric instability is great. Hence, Pd oxide adjacent to LaAlO$_3$ or NdAlO$_3$ is greater in electric fluctuation than an independent Pd oxide. Further, in the purification catalysts for exhaust gas in Manufacturing Examples 1 to 4, when manufacturing LaAlO$_3$ or NdAlO$_3$, by a process of once obtaining carboxylic complex polymer by evaporating and solidifying the aqueous solution of nitrate of constituent element containing carboxylic acid, LaAlO$_3$ or NdAlO$_3$ is produced in a single phase, and when supporting Pd oxide, the surface state is likely to interact with Pd oxide. In the process of manufacturing the mixed aqueous solution, malic acid is used, but the same effects are obtained by using citric acid or oxalic acid.

By contrast, in the purification catalysts for exhaust gas in Manufacturing Examples 5 to 7, sufficient performance cannot be obtained in low temperature operation as compared with the purification catalysts for exhaust gas in Manufacturing Examples 1 to 4, and the reason is as follows. In Manufacturing Example 5, Al$_2$O$_3$ is a stable compound, and it does not interact with the supported precious metal Pd, and the Pd itself is not enhanced in activity. In the purification catalyst for exhaust gas in Manufacturing Example 6, although the crystal system of Al oxide is trigonal or rhombohedral, since carboxylic acid is not used in the manufacturing process of catalyst, LaAlO$_3$ of single phase cannot be synthesized. Hence, sufficient specific surface area is not obtained, and the crystal lattice surface cannot be used in an active state. In the purification catalyst for exhaust gas in Manufacturing Example 7, the crystal system of Al oxide is orthorhombic, and the existence of electrons among component atoms is not as unstable as in the trigonal or rhombohedral system.

The purification catalyst for exhaust gas of the invention can be applied in an internal combustion engine of an automobile or the like in which it is required to purify and reduce simultaneously and effectively nitrogen oxide (NOx), carbon hydride (HC), and carbon monoxide (CO) contained in an exhaust gas.

The invention claimed is:

1. A method for production of a purification catalyst for exhaust gas, wherein the purification catalyst comprises a Pd oxide consisting of Ln$_2$PdO$_4$ supported by LnAlO$_3$, wherein Ln is a rare-earth element, the method comprising:
    providing at least one compound selected from the group consisting of compounds of carboxylic acid having a hydroxyl group or a mercapto group and having a carbon number of 2 to 20, dicarboxylic acid having a carbon number of 2 or 3, and monocarboxylic acid having a carbon number of 1 to 20; and
    adding said at least one compound to an aqueous nitrate solution including Ln and Pd and an aqueous nitrate solution including Ln and Al.

2. The method for production of a purification catalyst for exhaust gas according to claim 1, the method further comprising:
    evaporating the aqueous nitrate solution completely to produce a carboxylic acid complex polymer; and
    heating said carboxylic acid complex polymer.

3. The method for production of a purification catalyst for exhaust gas according to claim 2, wherein a heating temperature in said heating of the carboxylic acid complex polymer step is not more than 1000° C.

* * * * *